United States Patent
Le et al.

(10) Patent No.: US 10,377,496 B2
(45) Date of Patent: Aug. 13, 2019

(54) SYSTEMS AND METHODS FOR CONTROLLING AIRFLOW IN A VEHICLE

(71) Applicant: The Boeing Company, Seal Beach, CA (US)

(72) Inventors: Luong Hoang Le, Bothell, WA (US); George Bates, III, Bothell, WA (US); Myles Edward Brown, Bothell, WA (US); Brian P. Berryessa, Seattle, WA (US); Ryan S. Perham, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 1079 days.

(21) Appl. No.: 13/954,352

(22) Filed: Jul. 30, 2013

(65) Prior Publication Data
US 2015/0099444 A1   Apr. 9, 2015

(51) Int. Cl.
*B64D 13/04* (2006.01)
*B64D 13/06* (2006.01)

(52) U.S. Cl.
CPC ...... *B64D 13/06* (2013.01); *B64D 2013/0618* (2013.01); *B64D 2013/0688* (2013.01); *Y02T 50/56* (2013.01)

(58) Field of Classification Search
CPC ............ B64D 13/06; B64D 2013/0618; B64D 2013/0688
USPC .......................................................... 454/76
See application file for complete search history.

(56) References Cited

U.S. PATENT DOCUMENTS

| | | | |
|---|---|---|---|
| 2,830,521 A | 4/1958 | Fischer et al. | |
| 3,426,984 A | 2/1969 | Emmons | |
| 4,351,501 A | 9/1982 | Peash et al. | |
| 4,432,514 A | 2/1984 | Brandon | |
| 5,253,484 A | 10/1993 | Corman et al. | |
| 5,474,120 A | 12/1995 | Severson et al. | |
| 5,545,084 A | 8/1996 | Fischer et al. | |
| 5,695,396 A * | 12/1997 | Markwart | B64D 13/00 454/71 |
| 5,810,078 A * | 9/1998 | Knutsson | B60H 1/00735 165/202 |
| 5,956,960 A * | 9/1999 | Niggeman | B64D 13/06 60/785 |
| 6,159,091 A * | 12/2000 | Horstman | B64D 13/00 454/76 |
| 6,876,549 B2 | 4/2005 | Beitelmal et al. | |

(Continued)

OTHER PUBLICATIONS

Cyrus et al. ("Reversing of Axial Flow Fans for Ventilation", ASME 2011 Turbo Expo: Turbine Technical Conference and Exposition, Pub. 2011, URL: http://proceedings.asmedigitalcollection.asme.org/proceeding.aspx?articleid=1632623).*

*Primary Examiner* — Avinash A Savani
*Assistant Examiner* — Elizabeth M. May
(74) *Attorney, Agent, or Firm* — Coats & Bennett, PLLC

(57) ABSTRACT

An airflow control system for use in a vehicle is provided. The airflow control system includes a manifold and a recirculation duct in flow communication with the manifold. The recirculation duct includes a fan and a recirculation valve. The system additionally includes a ventilation duct coupled in flow communication with the recirculation duct between the fan and the recirculation valve. The ventilation duct is in flow communication with an ambient environment surrounding the vehicle and includes at least one ventilation valve.

20 Claims, 9 Drawing Sheets

(56) References Cited

U.S. PATENT DOCUMENTS

| | | | |
|---|---|---|---|
| 6,904,968 B2 | 6/2005 | Beitelmal et al. | |
| 7,013,968 B2 | 3/2006 | Beitelmal et al. | |
| 7,086,459 B2 | 8/2006 | Beitelmal et al. | |
| 7,370,695 B2 * | 5/2008 | Haglsperger | B60H 1/00507 165/108 |
| 7,575,421 B2 * | 8/2009 | McAuliffe | F04D 25/082 417/366 |
| 7,607,318 B2 * | 10/2009 | Lui | B64D 13/06 244/118.5 |
| 7,778,735 B2 | 8/2010 | Gray | |
| 8,240,331 B2 | 8/2012 | Appleby et al. | |
| 9,809,312 B2 * | 11/2017 | Reiss | B64D 13/00 |
| 2006/0080986 A1 * | 4/2006 | Inoue | B60H 1/00057 62/259.2 |
| 2006/0219842 A1 * | 10/2006 | Shell | B64D 13/06 244/118.5 |
| 2008/0060523 A1 * | 3/2008 | Tom | B01D 53/0446 96/109 |
| 2008/0283663 A1 * | 11/2008 | Space | B64D 13/06 244/118.5 |
| 2009/0071178 A1 * | 3/2009 | Major | B60H 1/00278 62/239 |
| 2011/0107777 A1 * | 5/2011 | Atkey | B64D 13/06 62/115 |
| 2014/0162542 A1 * | 6/2014 | Huart | B64D 13/02 454/74 |

* cited by examiner

SYSTEMS AND METHODS FOR CONTROLLING AIRFLOW IN A VEHICLE

DEVELOPMENT

The United States Government may have certain rights in this invention pursuant to Contract No. FA8625-11-C-6600, issued by the Department of the Air Force.

BACKGROUND

The present disclosure relates generally to control of airflow, and more particularly to systems and methods for supplying and controlling airflow into (defined herein as an air conditioning system) and within (defined herein as an air distribution system) a vehicle.

In at least some known aircraft, such as civilian passengers, civilian freighters or military derivatives, if an air conditioning system on the aircraft ceases to operate, fresh air is supplied into the aircraft from an ambient environment. More specifically, a hole is defined in the fuselage of the aircraft and ambient air enters the aircraft through the hole in order to maintain desirable air temperatures, carbon dioxide and other undesirable gas concentration levels. Further, during certain other conditions, the manifold and ducting of the air distribution system may become highly restricted due to shutdown of flow to certain compartments. The typical design compensation to overcome these conditions is to either design the air distribution system for operation at greatly increased pressures, and/or to operate the air conditioning system with greatly reduced airflow, neither of which are preferred modes of operation. Operating the air conditioning system at greatly increased pressure requires added weight in order to achieve sufficient duct strength and robust sealing on the manifold to prevent damage as a result of the over pressurization. The air conditioning system is limited to a minimum airflow rate which is governed by the ability of the system to adequately control incoming air temperatures and maintain the minimum rotational speed of high-energy rotating equipment such as air cycle machines which generally rely on air bearings. Accordingly, a system that efficiently provides fresh air into an aircraft in the event that an air conditioning system ceases to operate and/or during other non-preferable conditions, that also eliminates the need to design the air distribution system to operate at abnormally high pressures, and/or greatly reduced airflow rates, is desirable.

BRIEF DESCRIPTION

In one aspect, an airflow control system for use in a vehicle is provided. The airflow control system includes a manifold and a recirculation duct in flow communication with the manifold. The recirculation duct includes a fan and a recirculation valve. The system additionally includes a ventilation duct coupled in flow communication with the recirculation duct between the fan and the recirculation valve. The ventilation duct is in flow communication with an ambient environment surrounding the vehicle and includes at least one ventilation valve.

In another aspect, a method for controlling airflow in a vehicle is provided. The method includes controlling a fan included in a recirculation duct that is in flow communication with a manifold in the vehicle. The method additionally includes controlling a recirculation valve that is included in the recirculation duct. Additionally, the method includes controlling at least one ventilation valve included in a ventilation duct in flow communication with an ambient environment surrounding the vehicle and in flow communication with the recirculation duct, between the fan and the recirculation valve.

In another aspect, an aircraft is provided. The aircraft includes a manifold and a recirculation duct in flow communication with the manifold. The recirculation duct includes a fan and a recirculation valve. The aircraft additionally includes a ventilation duct coupled in flow communication with the recirculation duct between the fan and the recirculation valve. The ventilation duct is in flow communication with an ambient environment surrounding the aircraft and includes at least one ventilation valve.

DETAILED DESCRIPTION

Figure 1:
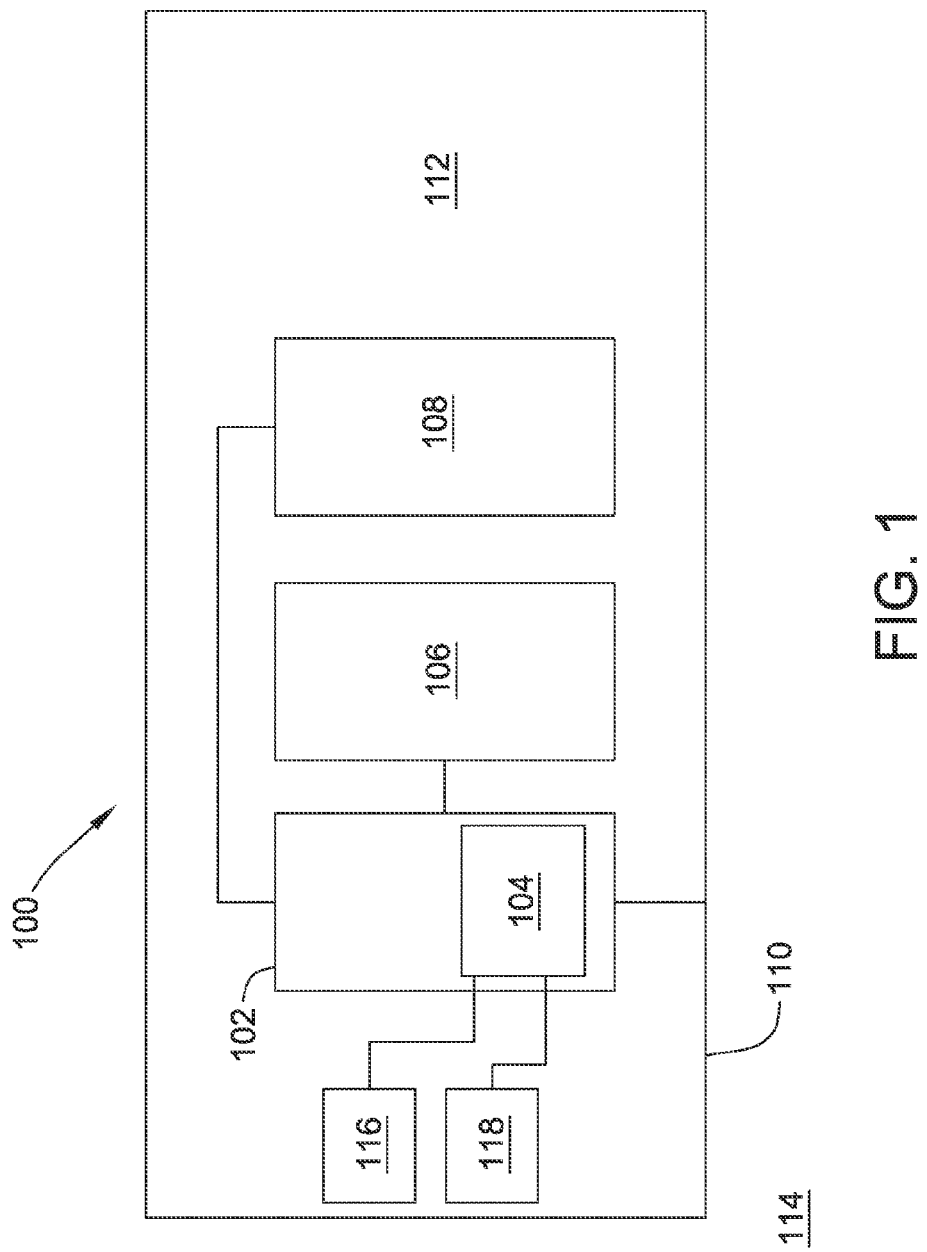
FIG. 1 is a block diagram of an example aircraft that includes an example airflow control system.

FIG. 1 is a block diagram of an example aircraft 100 that includes an example airflow control system 102. Airflow control system 102 includes a controller 104 that is operatively coupled to components of airflow control system 102, as described herein. Controller 104 controls components of airflow control system 102 to cause airflow control system 102 to operate in one of a plurality of configurations. In some implementations, controller 104 may be multiple controllers that each control separate components of airflow control system 102 and/or which share control of at least one component of airflow control system 102. Airflow control system 102 is in flow communication with a return air compartment 106 and a cargo compartment 108. More specifically, depending on the configuration, airflow control system 102 may direct air to and/or from return air compartment 106. Additionally, depending on the configuration, airflow control system 102 may direct air to cargo compartment 108. Aircraft 100 includes a skin 110 that separates an interior 112 of aircraft 100 from an ambient environment 114. Controller 104 receives data from an altitude sensor 116 and to a pressure sensor 118. In some implementations, one or both of altitude sensor 116 and pressure sensor 118 are components of controller 104 that receive data transmitted from an external provider of aeronautical information (e.g., altitude information) and which calculate cabin pressure based on the received altitude information. Airflow control system 102 is coupled to one or more inlet/outlet ports 310 (FIG. 3) defined in skin 110 to receive air from ambient environment 114. In some implementations, controller 104 may monitor components such as valves 306 and 322, fan 304, and/or air conditioning pack 316 to determine their operational status and/or reconfigure the components to adjust their operational status.

Figure 2:
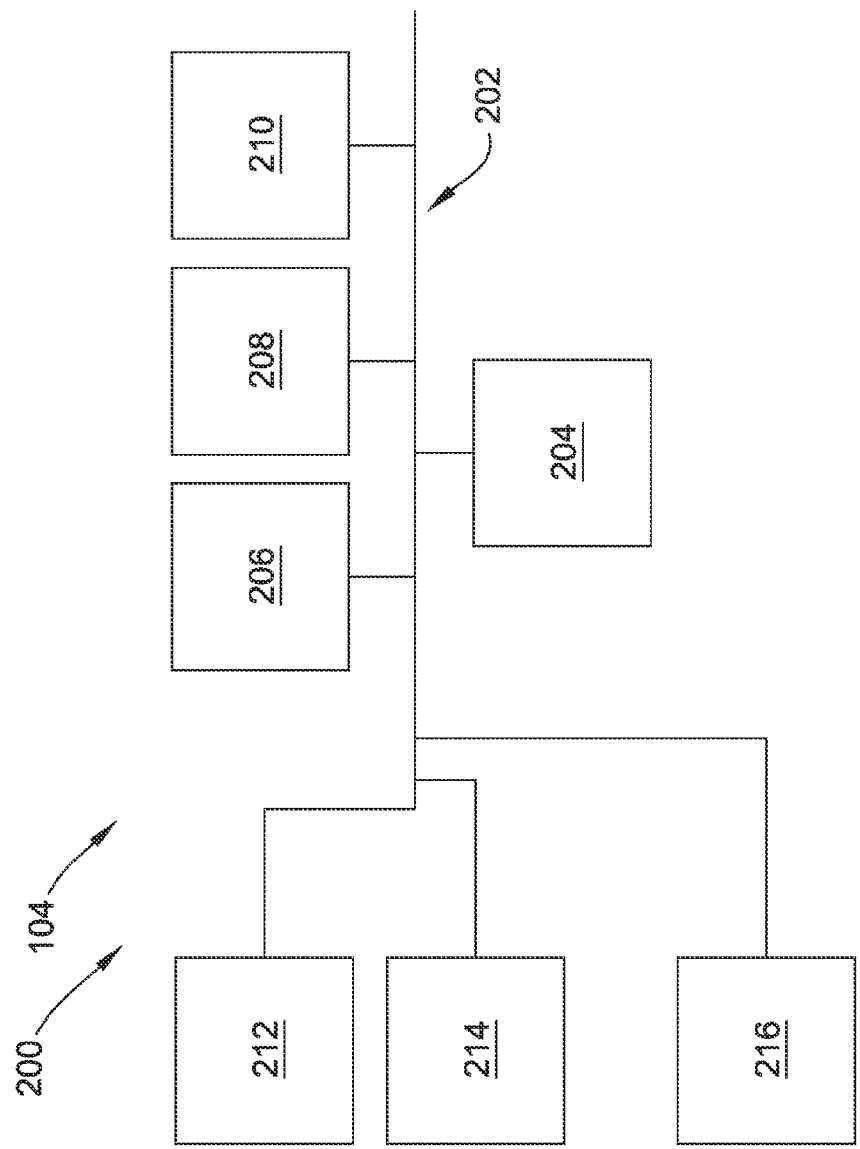
FIG. 2 is a block diagram of a controller included in the airflow control system of FIG. 1.

FIG. 2 is a block diagram of controller 104. More specifically, controller 104 is an instance of a computing device 200. Computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Main memory 206 may include a random access memory (RAM) or another type of dynamic storage device that stores information and instructions for execution by processor 204. ROM 208 may include a conventional ROM device or another type of static storage device that stores static information and instructions for use by processor 204. Storage device 210 may include a magnetic and/or optical recording medium and its corresponding drive.

Input device 212 may include a conventional mechanism that permits computing device 200 to receive commands, instructions, or other inputs from a user, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with components of airflow control system 102 and/or other devices (not shown).

As described herein, controller 104 facilitates transmitting instructions to components of airflow control system 102 to reconfigure airflow control system 102. Controller 104 may receive data and/or instructions that cause controller 104 to reconfigure airflow control system 102 from an initial configuration to a subsequent configuration. For example, as described herein, controller 104 may receive data indicating that smoke is present in cargo compartment 108 and may reconfigure airflow control system 102 to direct air away from (i.e., stop supplying air to) cargo compartment 108, as described in more detail herein. Additionally, controller 104 may perform other functions such as storage and/or transmission of data to one or more additional computing devices (not shown). Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. In other implementations, hardwired circuitry may be used in place of or in combination with software instructions to implement processes consistent with the subject matter herein. Thus, implementations consistent with the principles of the subject matter disclosed herein are not limited to any specific combination of hardware circuitry and software. Accordingly, controller 104 may include a combination of computing devices and/or may control discrete functions (e.g., opening/close valves and/or turning on/off fans) by simple electro-mechanical relays that may be triggered via analog discrete signal(s) from a computing device or directly from a sensor/detector device.

Figure 3:
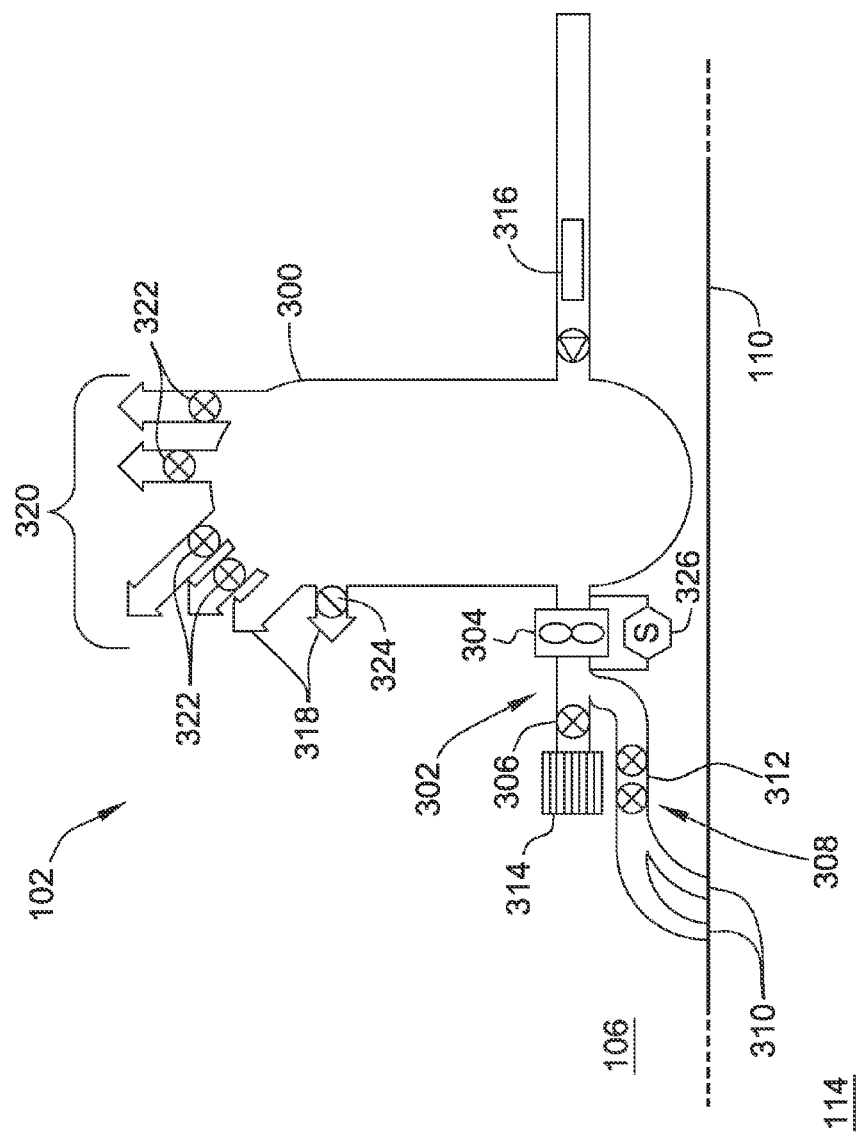
FIG. 3 is a diagram of the airflow control system of FIG. 1 in a first configuration.

FIG. 3 is a diagram of airflow control system 102 in a first configuration. Airflow control system 102 includes a manifold 300 in which air from one or more sources is mixed. Coupled in flow communication with manifold 300 is recirculation duct 302. In some implementations, recirculation duct is a 'T' duct. Recirculation duct 302 includes a fan 304 and a recirculation valve 306. Depending on the particular implementation, recirculation valve 306 may be a shutoff valve, a flow regulating valve, a check valve, or any other valve adapted to controllably open or close to control airflow. Fan 304 may be operated to direct air into manifold 300. In some implementations, fan 304 may also be operated to direct air out of manifold 300. Recirculation valve 306 may be selectively opened or closed to control airflow to and from return air compartment 106. A ventilation duct 308 is coupled in flow communication with recirculation duct 302, between fan 304 and recirculation valve 306. Ventilation duct 308 is in flow communication with ambient environment 114 through a plurality of ports 310 defined in skin 110 of aircraft 100. Some implementations include a single port 310 rather than a plurality of ports 310. Ventilation duct 308 includes a plurality of ventilation valves 312, which may be selectively opened to allow air from ambient environment 114 to be directed from ports 310 to recirculation duct 302 (or vice versa), or closed to prevent such airflow. Some implementations include a single ventilation valve 312 rather than a plurality of ventilation valves 312.

A filter 314 is coupled to recirculation duct 302. Filter 314 selectively receives air from or provides air to return air compartment 106, as described herein. In some implementations, fan 304 may operate in a forward direction to direct air from filter 314 and/or ventilation duct 308 into manifold 300 and may allow airflow to pass through while de-powered in a reverse direction to direct air from manifold 300 through filter 314 and/or ports 310. More specifically, in some implementations, when airflow is reversed through filter 314, fan 304 is de-powered and "windmilling", rather than actively directing the air in a direction. Manifold 300 is additionally coupled to air conditioning pack 316, which generates conditioned air and directs the conditioned air into manifold 300.

Air in manifold 300 is directed through passenger ducts 318 and/or compartment ducts 320. Each compartment duct 320 may include a valve 322 that selectively enables or disables airflow therethrough. Additionally, one or more of passenger ducts 318 may include a valve 324 for variably controlling the airflow rate therethrough. A sensor 326 is coupled to recirculation duct 302 and detects a presence of smoke passing through recirculation duct 302. For example, in an event of that causes smoke in aircraft 100, air passing through recirculation filter 314 into recirculation duct 302 may contain smoke that is detected by sensor 326. In some implementations, sensor 326 may detect that fan 304 is generating smoke due to overheating. After detecting the smoke, sensor 326 may transmit a signal to controller 104 indicating the detection of smoke. After receiving the signal, controller 104 may cause airflow control system 102 to operate in a different configuration, by changing a state of one or more of valves 306, 312, 322, and 324 and/or fan 304, as described herein. In other implementations, other types of sensors may be installed in lieu of sensor 326 in order to enable reconfigurations of airflow control system 102 based on criteria other than or in addition to a presence of smoke. In some implementations and depending on the type of fan 304, sensor 326 is omitted.

In the first configuration, air conditioning pack 316 is deactivated ("off"), fan 304 is deactivated ("off"), and valves 306, 312, 322, and 324 are closed. The first configuration may be used, for example, when aircraft 100 is parked on the ground and depowered. More specifically, prior to depowering or during a power-on built-in-test (BIT), controller 104 may transmit a signal to each of air conditioning pack 316, fan 304, and valves 306, 312, 322, and 322 to enter the states described above.

Figure 4:
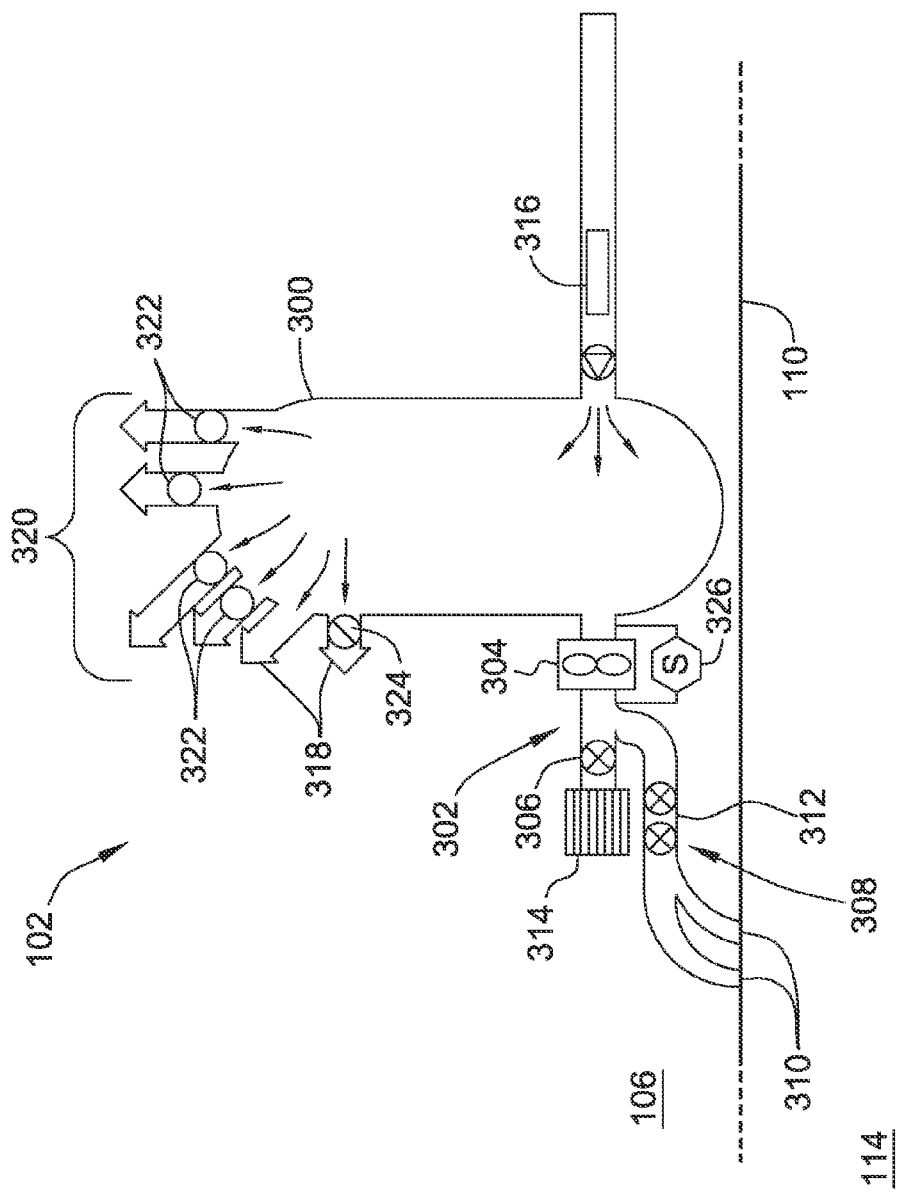
FIG. 4 is a diagram of the airflow control system of FIG. 1 in a second configuration.

FIG. 4 is a diagram of airflow control system 102 in a second configuration. Air conditioning pack 316 is activated, fan 304 is deactivated, and recirculation valve 306 is closed. Additionally, ventilation valves 312 are closed. However, valves 322 in compartment ducts 320 are open and valve 324 in passenger duct 318 is at least partially open. In the second configuration, aircraft 100 may be powered and operating either on the ground or in flight. While in the second configuration, airflow control system 102 facilitates providing fresh air from ambient environment 114 to downstream zones, such as return air compartment 106 and cargo compartment 108. More specifically, air from air conditioning pack 316 enters manifold 300 and passes through passenger ducts 318 and compartment ducts 322. To facilitate maintaining a target temperature in aircraft 100, the flow of air from air conditioning pack 316 is maintained at a constant level and air is able to freely pass through manifold 300, rather than being blocked by one or more of valves 322 and 324.

Figure 5:
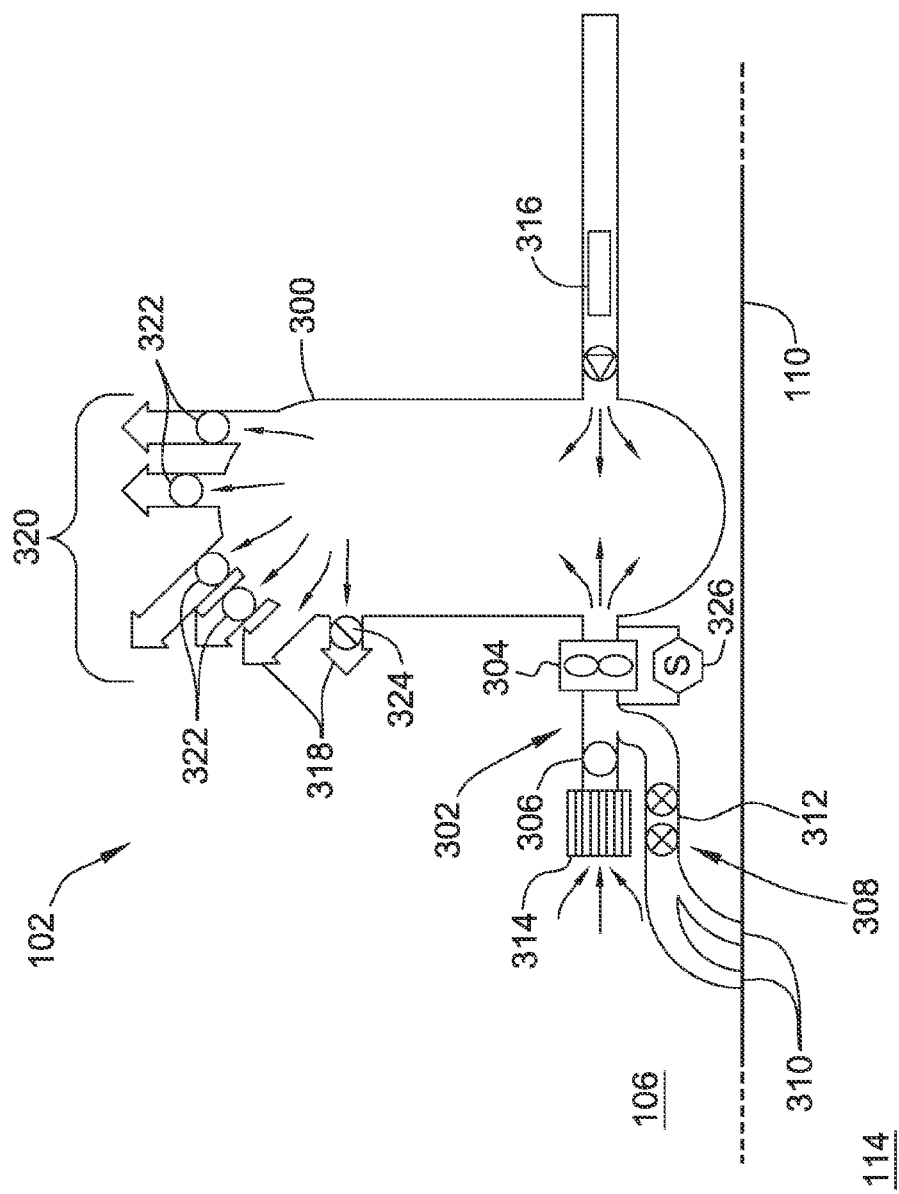
FIG. 5 is a diagram of the airflow control system of FIG. 1 in a third configuration.

FIG. 5 is a diagram of airflow control system 102 in a third configuration. The third configuration is typical when aircraft 100 is powered and operating either on the ground or in flight. Air conditioning pack 316 is activated, fan 304 is activated (i.e., operating in a forward direction), recirculation valve 306 is open, and ventilation valves 312 are closed. Accordingly, air from return air compartment 106 is pulled through filter 314 by fan 304 and into manifold 300. Inside manifold 300, air from return air compartment 106 mixes with air from air conditioning pack 316 and is directed through passenger ducts 318 and compartment ducts 320 to return air compartment 106 and cargo compartment 108, respectively. More specifically, valves 322 of compartment ducts 320 are open, and valve 324 of passenger duct 318 is at least partially open. Controller 104 may configure airflow control system 102 to operate in the third configuration to facilitate conserving power that would otherwise be used by air conditioning pack 316 to generate conditioned air.

Figure 6:
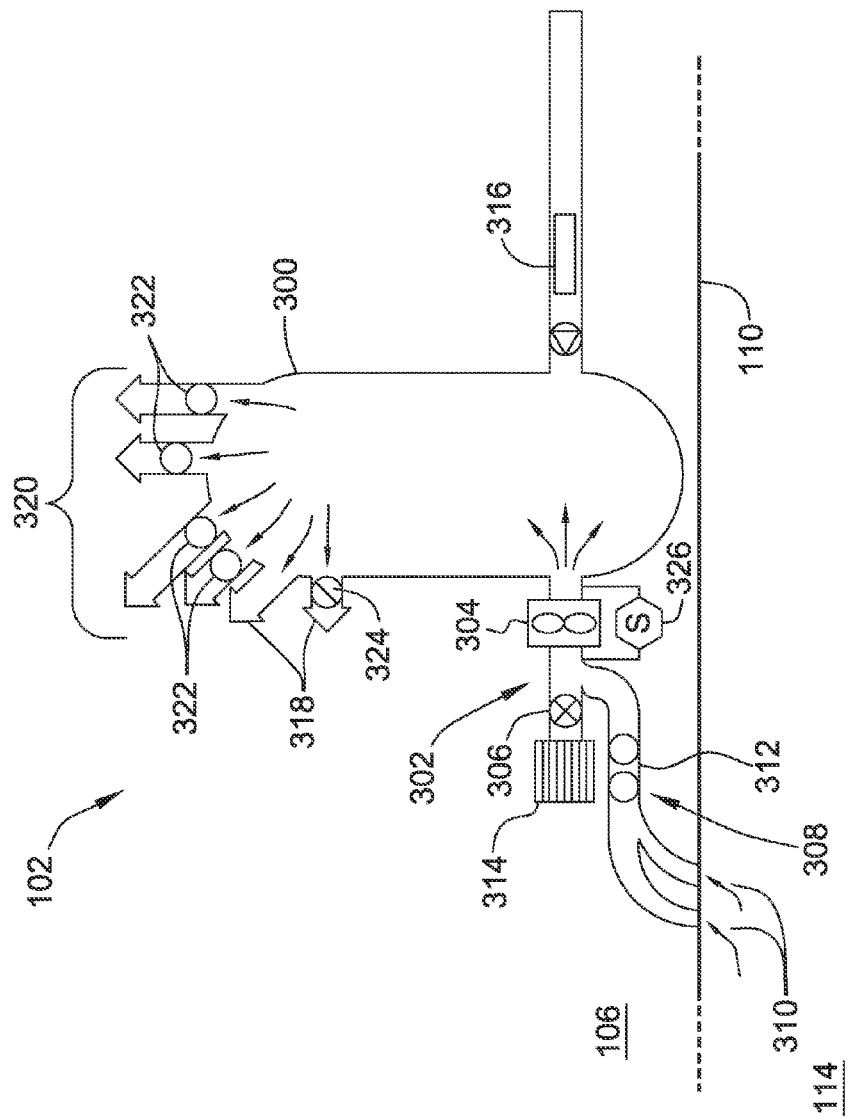
FIG. 6 is a diagram of the airflow control system of FIG. 1 in a fourth configuration.

FIG. 6 is a diagram of airflow control system 102 in a fourth configuration. Air conditioning pack 316 is deactivated, fan 304 is activated (i.e., operating in a forward direction), recirculation valve 306 is closed, and ventilation valves 312 are open. Controller 104 may transmit signals to components of airflow control system 102 to enter the fourth configuration upon receiving a signal, for example from air conditioning pack 316, that air conditioning pack 316 has stopped operating. In some implementations, controller 104 may additionally require confirmation, for example from a signal from an altitude sensor 116 (FIG. 1) that aircraft 100 is at an altitude of 10,000 feet or less before reconfiguring airflow control system 102 to the fourth configuration. Additionally, in some implementations, controller 104 may additionally require confirmation, for example from a signal transmitted from a pressure sensor 118 (FIG. 1), that aircraft 100 is unpressurized, before reconfiguring airflow control system 102 to the fourth configuration. In the fourth configuration, air passes through ports 310, through ventilation duct 308, through recirculation duct 302, through manifold 300, and into return air compartment 106 and cargo compartment 108, via passenger duct 318 and compartment ducts 320. More specifically, valves 322 in compartment ducts 322 are open and valve 324 in passenger duct 318 is at least partially open. In the fourth configuration, airflow control system 102 provides sufficient airflow to return air compartment 106 and cargo compartment 108 to facilitate preventing a buildup of heat and/or gas concentrations when air conditioning pack 316 is not operating.

Figure 7:
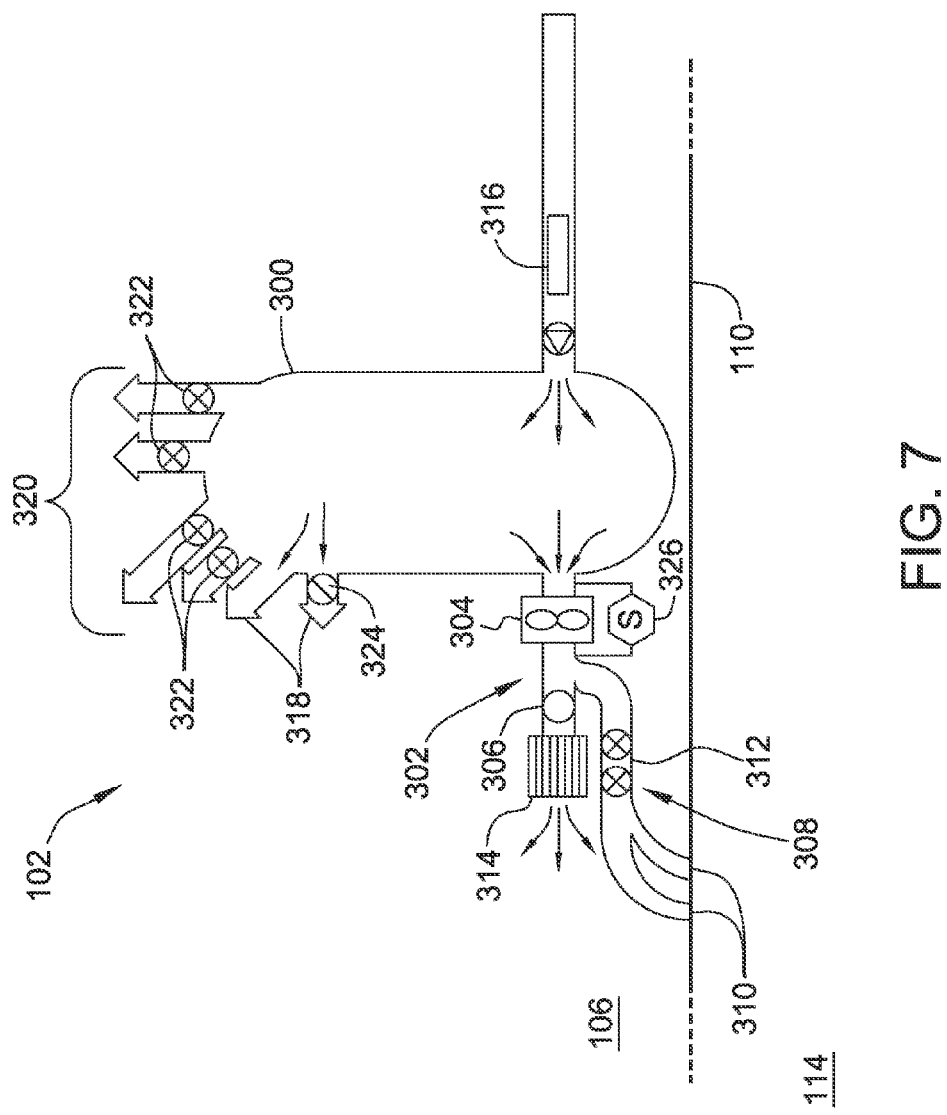
FIG. 7 is a diagram the airflow control system of FIG. 1 in a fifth configuration.

FIG. 7 is a diagram of airflow control system 102 in a fifth configuration. Air conditioning pack 316 is activated, fan 304 is deactivated, recirculation valve 306 is open and ventilation valves 312 are closed. Valves 322 are closed and valve 324 is at least partially closed. Controller 104 may reconfigure airflow control system 102 to the fifth configuration after receiving a signal from sensor 326 that smoke is present in a compartment on the airplane. Alternatively, pilots may manually initiate this configuration if an occupant in one of the compartments reports the presence of smoke. By causing valves 322 to close, controller 104 prevents manifold 300 from delivering additional air to cargo compartment 108, to control smoke penetration and to avoid delivering oxygen to cargo compartment 108. In some implementations, controller 104 may reconfigure airflow control system 102 to the fifth configuration as an intermediate step before aircraft 100 is depressurized in response to the presence of smoke. Depressurization of an aircraft followed by an ascent or descent to 25,000 feet for the remainder of flight is a technique recognized by the Federal Aviation Administration (FAA). For example, controller 104 may determine whether aircraft 100 has been depressurized based on a signal transmitted to controller 104 from a pressure sensor 118 (FIG. 1). Given that valves 322 are closed, an output path for air in compartment ducts 320 is restricted thereby requiring a means to prevent the pressure in the manifold 300 and associated ducting from reaching undesirable levels.

To facilitate relieving pressure in manifold 300, controller 104 configures recirculation valve 306 to be open. Accordingly, at least a portion of the conditioned air entering into manifold 300 from air conditioning pack 316 passes through recirculation duct, in a reverse direction through the recirculation fan 304 while it is deactivated and in reverse through the recirculation filter 314, and into return air compartment 106. In some implementations, rather than deactivating fan 304, controller 104 configures fan 304 to operate in a reverse direction that facilitates pulling air from manifold 300. In summary, controller 104 reconfigures airflow control system 102 to the fifth configuration to relieve pressure in manifold 300 when smoke has been detected in aircraft 100, but depressurization of aircraft 100 has not been initiated or is not yet complete. By causing recirculation valve 306 in recirculation duct 302 to open, controller 104 facilitates enabling air conditioning pack 316 to continue operating at a desirable flow rate without over-pressurizing manifold 300.

Figure 8:
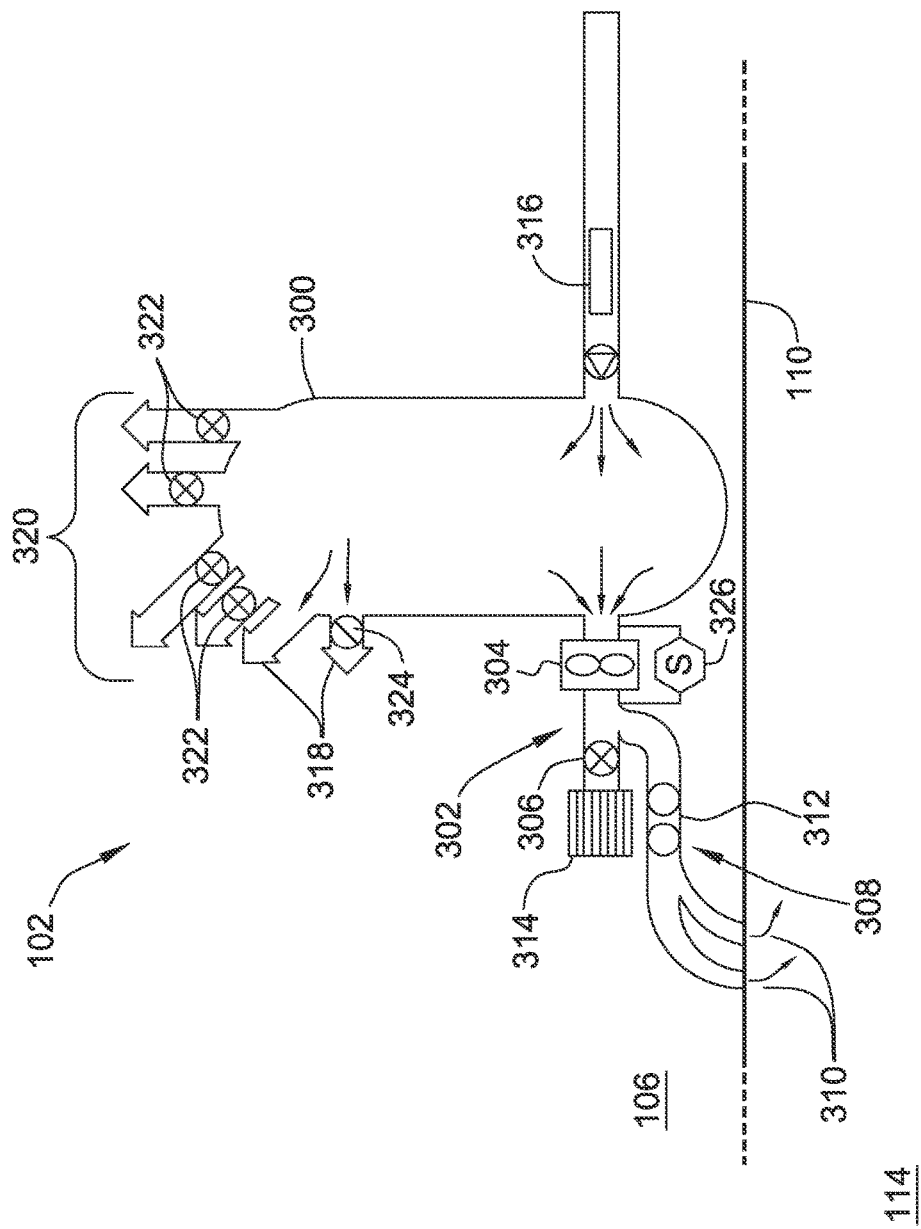
FIG. 8 is a diagram of the airflow control system of FIG. 1 in a sixth configuration.

FIG. 8 is a diagram of airflow control system 102 in a sixth configuration. In the sixth configuration, air conditioning pack 316 is activated, fan 304 is deactivated, recirculation valve 306 is closed and ventilation ducts 308 are open. Additionally, valves 322 of compartment ducts 320 are closed and valve 324 of passenger duct 318 is at least partially closed. Controller 104 may reconfigure airflow control system 102 to the sixth configuration during the event described above, after full depressurization of aircraft 100 has occurred. More specifically, controller 104 reconfigures airflow control system 102 to the sixth configuration after receiving a signal from sensor 326 or another sensor that smoke is detected and after receiving a signal from the pressure sensor 118 (FIG. 1) that aircraft 100 has been fully depressurized. In the sixth configuration, at least a portion of air from air conditioning pack 316 passes through manifold 300, through recirculation duct 302, and out of aircraft 100 through ports 310. Like the fifth configuration, the sixth configuration facilitates enabling air conditioning pack 316 to continue operating at a desirable flow rate without over-pressuring manifold 300. More specifically, given that airflow through compartment ducts 320 is restricted, by causing ventilation valves 312 to open, controller 104 provides a pressure relief path through recirculation duct 302, through ventilation duct 308, and through ports 310 to ambient environment 114. In some implementations, rather than deactivating fan 304, controller configures fan 304 to operate in a reverse direction to pull air from manifold 300.

Figure 9:
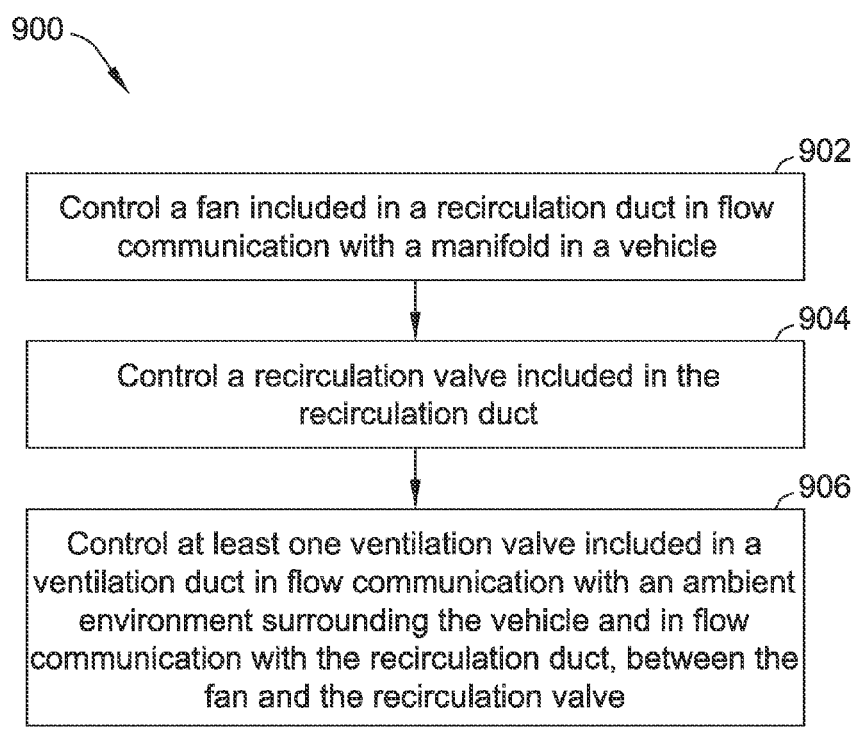
FIG. 9 is a flow chart of an example method for controlling airflow using the airflow control system of FIG. 1.

FIG. 9 is a flow chart of an example method 900 for controlling airflow using airflow control system 102. Method 900 may be performed, for example, by controller 104. Method 900 includes controlling 902 a fan, for example fan 304, included in a recirculation duct, for example recirculation duct 302, in flow communication with a manifold, for example manifold 300, in a vehicle, for example aircraft 100. In controlling fan 304, controller 104 may configure fan 304 to operate in a forward direction to pull air from return air compartment 106 and/or ports 310, in a reverse direction to pull air from manifold 300, or may deactivate fan 304. As described above, controller 104 may configure fan 304 to operate in a forward direction in the third configuration and/or the fourth configuration. Additionally, as described above, controller 104 may configure fan 304 to operate in a reverse direction in the fifth configuration and/or the sixth configuration. Further, as described above, controller may configure fan 304 to be deactivated in the first configuration, the second configuration, the fifth configuration, and/or the sixth configuration.

Method 900 additionally includes controlling 904 a recirculation valve, for example recirculation valve 306, included in recirculation duct 302. More specifically, controller 104 configures recirculation valve 306 to be one of opened and closed. As described above, by opening recirculation valve 306, air entering into recirculation duct 302, for example from manifold 300, may pass through filter 314 and into return air compartment 106. As described above, controller 104 may configure recirculation valve 306 to be opened in the third configuration and/or the fifth configuration. By closing recirculation valve 306, air is prevented from passing through filter 314. As described above, controller 104 may configure recirculation valve 306 to be closed in the first configuration, the second configuration, the fourth configuration, and/or the sixth configuration.

Additionally, method 900 includes controlling 906 at least one ventilation valve, for example ventilation valves 312, included in a ventilation duct, for example ventilation duct 308, in flow communication with an ambient environment, for example ambient environment 114, surrounding aircraft 100. Ventilation duct 308 is additionally in flow communication with recirculation duct 302, between fan 304 and recirculation valve 306. As described above, controller 104 may configure ventilation valves 312 to be opened. For example, in the fourth configuration, controller 104 configures ventilation valves 312 to be opened to allow air from ambient environment 114 to pass into ventilation duct 308 through ports 310. As another example, and as described above with reference to the sixth configuration, controller 104 may configure ventilation valves 312 to be opened to allow air from air conditioning pack 316 to pass through manifold 300 and through ports 310, to facilitate preventing over-pressurization of manifold 300. As described above, controller may configure ventilation valves 312 to be closed to prevent air from ambient environment from entering into manifold 300, such as in the first configuration, the second configuration, the third configuration, and the fifth configuration.

A technical effect of systems and methods described herein includes at least one of: (a) controlling a fan included in a recirculation duct in flow communication with a manifold in a vehicle; (b) controlling a recirculation valve included in the recirculation duct; and (c) controlling at least one ventilation valve included in a ventilation duct in flow communication with an ambient environment surrounding the vehicle and in flow communication with the recirculation duct, between the fan and the recirculation valve.

As compared to known methods and systems for controlling airflow in a vehicle such as an aircraft, the methods and systems described herein facilitate efficiently providing fresh air into the aircraft in the event of one or more air conditioning packs ceasing to operate. Moreover, the systems and methods described herein facilitate preventing over-pressurization of airflow control system components while maintaining the airflow from an air conditioning pack within an acceptable range with plenty of margin.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airflow control system for use in a vehicle, the system comprising:
   an air conditioning pack positioned along an air conditioning duct;
   a manifold configured to receive through s aid air conditioning duct conditioned ambient air from said air conditioning pack and channel the conditioned ambient air into at least one compartment of the vehicle;
   a recirculation duct in flow communication with said manifold and separate from the air conditioning duct, said recirculation duct comprising a recirculation valve and a fan coupled between said manifold and said recirculation valve, said fan configured to channel airflow through said manifold towards the at least one compartment of the vehicle when operated in a first direction and channel airflow from said manifold into said recirculation duct when operated in a second direction; and a ventilation duct coupled in flow communication with said recirculation duct between said fan and said recirculation valve, said ventilation duct in flow communication with an ambient environment surrounding the vehicle and comprising at least one ventilation valve for ambient airflow to enter into the ventilation duct;

wherein said manifold is positioned between the fan and the air conditioning pack with the fan configured to channel the ambient airflow to said manifold through said ventilation and recirculation ducts without passing through the air conditioning pack when operated in the first direction.

2. The airflow control system of claim 1, wherein said recirculation duct is additionally in flow communication with a return air compartment of the vehicle.

3. The airflow control system of claim 1, further comprising a filter coupled to said recirculation duct.

4. The airflow control system of claim 1, wherein said ventilation duct further comprises at least one port defined through a skin of the vehicle.

5. The airflow control system of claim 1, further comprising a controller in communication with said fan and said valves, wherein said controller controls said fan and said valves.

6. The airflow control system of claim 5, wherein said controller is configured to open said recirculation valve, close said at least one ventilation valve, and operate said fan to pull air from a return air compartment into said manifold to recirculate air.

7. The airflow control system of claim 5, wherein said controller is configured to close said recirculation valve, open said at least one ventilation valve, and operate said fan to draw ambient air into said manifold.

8. The airflow control system of claim 5, wherein said controller is configured to open said recirculation valve and close said at least one ventilation valve to pull air from said manifold into a return air compartment.

9. The airflow control system of claim 5, wherein said controller is configured to close said recirculation valve and open said at least one ventilation valve to direct air from said manifold to the ambient environment.

10. The airflow control system of claim 1, wherein said manifold comprises a passenger duct and a plurality of compartment ducts, wherein each compartment duct comprises a valve.

11. A method for controlling airflow in a vehicle, said method comprising: receiving through an air conditioning duct, by a manifold in the vehicle, conditioned ambient air from an air conditioning pack and channeling the conditioned ambient air into at least one compartment of the vehicle; controlling a fan included in a recirculation duct in flow communication with the manifold, the recirculation duct being separate from the air conditioning duct; controlling a recirculation valve included in the recirculation duct, wherein the fan is coupled between the manifold and the recirculation valve; operating the fan in a first direction to channel airflow through the manifold towards the at least one compartment of the vehicle and operating the fan in a second direction to channel airflow from the manifold into the recirculation duct; and controlling at least one ventilation valve included in a ventilation duct between the fan and the recirculation valve, the ventilation duct in flow communication with an ambient environment surrounding the vehicle and in flow communication with the recirculation duct, wherein the fan is configured to channel ambient airflow to the manifold through the ventilation and recirculation ducts towards the at least one compartment without moving through the air—conditioning—pack when operated in the first direction.

12. The method of claim 11, wherein:
controlling the fan further comprises operating the fan in a forward direction to pull air from a return air compartment into the manifold to recirculate air;
controlling the recirculation valve further comprises opening the recirculation valve; and
controlling the at least one ventilation valve comprises closing the at least one ventilation valve.

13. The method of claim 11, wherein:
controlling the fan further comprises operating the fan in a forward direction to draw ambient air into said manifold;
controlling the recirculation valve further comprises closing the recirculation valve; and
controlling the at least one ventilation valve further comprises opening the at least one ventilation valve.

14. The method of claim 11, wherein:
controlling the recirculation valve further comprises opening the recirculation valve; and
controlling the at least one ventilation valve further comprises closing the at least one ventilation valve to pull air from the manifold into a return air compartment.

15. The method of claim 14, wherein controlling the fan further comprises deactivating the fan or operating the fan in a reverse direction to facilitate pulling air from the manifold into the return air compartment.

16. The method of claim 11, wherein:
controlling the recirculation valve further comprises closing the recirculation valve;
controlling the at least one ventilation valve further comprises opening the at least one ventilation valve to direct air from the manifold to the ambient environment.

17. The method of claim 16, wherein controlling the fan further comprises deactivating the fan or operating the fan in a reverse direction to facilitate directing air from the manifold to the ambient environment.

18. The method of claim 11, further comprising:
detecting a presence of smoke with a smoke detector coupled to the recirculation duct; and
closing at least one valve included within at least one compartment duct included in the manifold.

19. An aircraft comprising:
a manifold configured to receive conditioned ambient air from an air conditioning duct that includes an air conditioning pack and that the manifold is configured to channel the conditioned ambient air into at least one compartment of the aircraft;
a recirculation duct in flow communication with said manifold, said recirculation duct separate from said air conditioning duct to move ambient airflow into the manifold at a point away from the air conditioning duct, said recirculation duct comprising a recirculation valve and a fan coupled between said manifold and said recirculation valve, said fan configured to channel airflow through said manifold towards the at least one compartment of the aircraft when operated in a first direction and channel airflow from said manifold into said recirculation duct when operated in a second direction; and a ventilation duct coupled in flow communication with said recirculation duct between said fan and said recirculation valve, said ventilation duct in flow communication with an ambient environment surrounding said aircraft and comprising at least one ventilation valve, wherein said fan is configured to channel the ambient airflow to said manifold through said ventilation and recirculation ducts towards the at least one compartment when operated in the first direction, wherein said fan is further configured to channel airflow from said manifold into the ambient environment through said ventilation and recirculation ducts when operated in the second direction and said recirculation valve is closed;

the manifold positioned between the ventilation duct and the air conditioning duct with the ambient airflow being moved from the ambient environment through the ventilation duct and the recirculation duct and into the manifold without passing through the air conditioning pack.

20. The aircraft of claim 19, further comprising a return air compartment in flow communication with said recirculation duct.

* * * * *